(«12») United States Patent
Schmitt et al.

(10) Patent No.: US 8,848,287 B2
(45) Date of Patent: Sep. 30, 2014

(54) ADJUSTMENT DEVICE FOR OPTICAL SYSTEMS

(75) Inventors: Christoph Schmitt, Biebertal (DE); Stephan Kern, Rehe (DE)

(73) Assignee: Schmidt & Bender GmbH & Co. KG, Biebertal (DE)

( * ) Notice: Subject to any disclaimer, the term of this patent is extended or adjusted under 35 U.S.C. 154(b) by 15 days.

(21) Appl. No.: 13/331,178

(22) Filed: Dec. 20, 2011

(65) Prior Publication Data

US 2012/0154907 A1 Jun. 21, 2012

(30) Foreign Application Priority Data

Dec. 20, 2010 (DE) .......................... 10 2010 061 349

(51) Int. Cl.
*G02B 23/00* (2006.01)
*G02B 23/14* (2006.01)
*F41G 1/38* (2006.01)

(52) U.S. Cl.
CPC . *F41G 1/38* (2013.01); *G02B 23/14* (2013.01)
USPC ............. 359/429; 359/427; 359/399; 42/119

(58) Field of Classification Search
USPC ...................... 359/427, 429, 700; 42/126, 119
See application file for complete search history.

(56) References Cited

U.S. PATENT DOCUMENTS

| | | | |
|---|---|---|---|
| 4,982,502 A | 1/1991 | Weyrauch | |
| 6,721,095 B2 | 4/2004 | Huber | |
| 7,495,847 B2 * | 2/2009 | Thomas | ......................... 359/811 |
| 7,612,952 B2 | 11/2009 | Schäfer | |
| 7,640,830 B2 * | 1/2010 | Bonis | ........................... 74/813 L |
| 2006/0268433 A1 * | 11/2006 | Thomas | ......................... 359/811 |
| 2007/0240356 A1 * | 10/2007 | Klepp et al. | ..................... 42/122 |
| 2008/0066364 A1 | 3/2008 | Klepp et al. | |
| 2008/0236018 A1 | 10/2008 | Halverson | |
| 2009/0205461 A1 * | 8/2009 | Windauer | ........................ 74/553 |
| 2010/0157292 A1 * | 6/2010 | Tsai et al. | ...................... 356/247 |

FOREIGN PATENT DOCUMENTS

| | | |
|---|---|---|
| DE | 3208814 A1 | 9/1983 |
| DE | 3737856 A1 | 5/1989 |
| DE | 29720737 U1 | 2/1998 |
| DE | 19913461 A1 | 8/1999 |
| DE | 102006016834 A1 | 10/2007 |

OTHER PUBLICATIONS

German Office action for Application No. 10 2010 061 349.5 dated Aug. 17, 2011.

* cited by examiner

*Primary Examiner* — Alicia M Harrington
*Assistant Examiner* — Marin Pichler
(74) *Attorney, Agent, or Firm* — Marshall, Gerstein & Borun LLP

(57) ABSTRACT

An adjustment tower for telescopic sights includes a first adjustment device and a second adjustment device, which are capable of rotating independently of one another relative to a base. The first adjustment device can be rotated in an adjustment position and has a secured position in which it is secured against rotation. The first adjustment device is also axially movable relative to the base to a limited extent such that in the adjustment position, the adjustment device projects further out of the second adjustment device than in the secured position. The tower further includes a stored-energy device that exerts an axial force on the first adjustment device from the secured position in the direction of the adjustment position.

17 Claims, 5 Drawing Sheets

ADJUSTMENT DEVICE FOR OPTICAL SYSTEMS

CROSS-REFERENCE TO RELATED APPLICATIONS

The priority benefit of German Patent Application No. 10 2010 061 349.5, filed Dec. 20, 2010, is hereby claimed and the entire contents thereof are incorporated herein by reference.

FIELD OF THE DISCLOSURE

The present disclosure relates to an adjustment tower for telescopic sights.

BACKGROUND

Telescopic sights have experienced significant development in recent decades, particularly for hunting purposes, but also for military use. They typically consist of a matted metal housing, generally cylindrical in shape, at each end of which a tube comprising ocular and/or objective optics is disposed, and between these, a reversing assembly for image erection. In this center, narrower tubular region, a reticle is also provided, i.e., the target mark preferably mounted in the lens image plane. For adjusting said reticle, a mechanical adjustment mechanism projecting radially outward from the center tubular region, for example, an adjustment screw according to DE 32 08 814 A1 or DE 37 37 856 A1 is generally used.

It is critical to enable adjustment such that the point of aim and the position of the point of impact coincide. If target distances fluctuate substantially, parallax-based deviations in the target image plane from the reticle plane can be extremely disruptive. Therefore, compensation for parallax is essential. Traditionally, this is accomplished by displacing the objective lens axially. Manufacturing tolerances and crosswinds can lead to lateral deviations, which must be corrected using a lateral adjustment device.

To adjust the reticle, therefore, at least two adjustment towers are mounted on the exterior of the telescopic sight, spaced 90 degrees around the circumference thereof, each of which comprises an adjustment device in the form of a click-stop ring or an adjusting cap. A first and a second adjustment tower are used for vertical and for lateral adjustment.

For example, DE 297 207 37 U1 describes a telescopic sight having a tubular housing, which comprises tubular mounts for eyepiece and lens positioning. In this case, an optical reversing assembly and a reticle assigned thereto are provided in a center tube, said reticle being securely mounted in a frame on the double tube. A drive mechanism equipped with threading is guided in a slot in the tubular body, and presses forward toward the reversing assembly against the force of a spring. It can be moved forward and backward in its longitudinal direction by rotating the adjustment device.

An adjustment unit of this type, which is capable of rotating a total of approximately 360 degrees, ordinarily has a fine click-stop mechanism, which is subdivided such that as the unit is rotated (click-stop adjustment) it moves a step farther with each click, thereby adjusting the position of the point of impact of 100 m by 10 mm, for example. On the outer periphery of the adjustment tower, a scale is applied, on which the correction that is made can be read during daylight hours. Depending upon the subdivision, for example, each click is marked by a white line, whereas every tenth click is identified by a number.

For sharpshooting or other special purposes, particularly with shooting ranges of up to 2,000 m, a click-stop, i.e., a single click, corresponds to an adjustment in the point of impact of up to 200 mm. It is therefore necessary for the shooter to know the precise adjustment position of the reticle device.

An adjustment tower for lateral adjustment is similar in embodiment.

However, it is problematic with the known embodiments of the prior art that the reticle device can become unintentionally displaced when the shooting location is changed. For example, displacement can occur by an article of clothing rubbing against one of the adjustment devices. Therefore, in the prior art, various devices have been developed that enable the adjustment devices to be arrested.

To perform a selective and verifiable adjustment in the dark, the shooter must detect, by touch or by sensory motor means, the number of click stops that are traceable in the adjustment to a desired adjustment position or fixing of the adjustment device, i.e., the user must sense each click-stop process and must be able to determine the precise adjustment position on the basis of the number of click stops. With a fine click-stop mechanism, and associated with this, a large adjustment range, the danger exists that the user will lose count during adjustment, and therefore, a reliable adjustment is not ensured.

Furthermore, the reticle is difficult to read in the dark. Therefore, with modern telescopic sights for hunting, the trend is toward models having so-called lighted reticles. With such embodiments, part of the reticle, for example, the target point or crosshairs, can be illuminated, in order to obtain increased contrast of the reticle, or of a part thereof, depending upon the application.

Embodiments currently on the market are controlled on the device itself, specifically using a combined on/off switch and brightness controller. A viewing device of this type is known from DE 199 13461 A 1, wherein the illumination device is embodied as an attachment for a conventional telescopic sight having a non-illuminated reticle. The illumination also allows an adjustment scale for parallax to be visualized in the optics of the telescopic sight, which scale can be easily read by the shooter, even in the dark. The brightness of the illumination can be adjusted to the existing light conditions using the illumination adjustment device.

For actuating an illumination device of this type, for example, DE 297 20 737 U1 provides a lighting adjustment device which is such that a third adjustment tower is arranged on the telescopic sight.

Also known on the market are adjustment towers from Premier Reticles and from Nightforce, which comprise an adjustment tower for telescopic sights having two adjustment devices, particularly for a combination of illumination adjustment and parallax adjustment.

Models from Nightforce are equipped with adjustment towers having a rotatable parallax adjustment device and an ON/OFF switch for adjusting illumination.

Telescopic sights from Premier Reticles have an adjustment tower consisting of a first adjustment device and a second adjustment device, which can be rotated independently of one another relative to a base, wherein the first adjustment device can be rotated into an adjustment position and has a secured position in which it is secured against rotation, and the first adjustment device can be moved axially relative to the base to a limited extent such that in the first adjustment position, said adjustment device projects further out of the second adjustment device than in the secured position.

The disadvantage of this prior art is that the shooter must pull the first adjustment device out of the second adjustment device in order to rotate it. Therefore, the shooter must be able to securely grasp the first adjustment device. For this purpose, the prior art provides a collar, which is relatively wide, so that the shooter can easily grasp it. Accordingly, the first adjustment device also projects relatively far forward in the secured position. Nevertheless, pulling the devices apart is relatively inconvenient for the shooter. Additionally, in principle, the first device for adjusting illumination is required only in the dark, and in light conditions the projection forms more of an obstacle for the shooter.

It is a further disadvantage that the first adjustment device can be moved to the secured position in only one angle of rotation, more particularly, the light-OFF position. To turn the light on again, the first adjustment device must therefore be rotated back to the desired light intensity. During the time required for this step, the target could have moved out of shooting range.

In addition, the greater structural height of the adjustment tower acts as a lever arm when handled, and can also become caught more easily on objects, such as a tree, a stone, etc. The larger the lever arm is, the greater the risk of plastic deformations such that point of aim and point of impact no longer coincide.

GENERAL DESCRIPTION

The present disclosure therefore addresses the problem of devising an adjustment tower comprising two adjustment devices, which is as compact in design as possible in order to minimize lever forces acting on the telescopic sight during handling, but which can nevertheless be operated intuitively and with a high degree of user comfort by the shooter. The present disclosure further addresses the problem of configuring said adjustment tower such that, for example, the lighting mechanism will not be unintentionally activated or adjusted, and the optics will not be unintentionally adjusted. The solution should allow the adjustments to be carried out rapidly but precisely, in both dark and light conditions. The adjustment tower should expediently be simple in construction and advantageous in terms of production, should be sturdy and should have a long service life, and should overcome the additional disadvantages of the prior art.

The present disclosure relates to an adjustment tower for telescopic sights consisting of a first adjustment device and a second adjustment device, which can be rotated independently of one another relative to a base, wherein the first adjustment device can be rotated in an adjustment position and has a secured position in which it is secured against rotation, and the first adjustment device can be moved axially relative to the base to a limited extent such that in the adjustment position, the first adjustment device projects further out of the second adjustment device than in the secured position, and wherein a stored-energy device exerts an axial force on the first adjustment device from the secured position in the direction of the adjustment position.

The second adjustment device is generally embodied as axially fixed in relation to the base. The base can consist of a plurality of parts for manufacturing and assembly purposes, and can also comprise a region of the housing of the telescopic sight. However, none of the parts of the base rotate with a rotation of either the first adjustment device or the second adjustment device. Additionally, the base can have a connecting passage to the telescopic sight to allow a cable to be routed through it, for example, or to produce a mechanical connection to adjustment elements.

An embodiment of this type is advantageous in that the actuating force required for moving the first adjustment device from the secured position into the adjustment position need not be applied by the shooter. The process of actively pulling out the first adjustment device is eliminated. Instead, the first adjustment device is moved into the adjustment position by the stored-energy device. This increases ease of use substantially.

The present disclosure further enables a compact configuration of the adjustment tower, since no projecting collar is provided that the shooter must grasp. Therefore, the risk of deformations resulting from lever forces acting on the telescopic sight during handling is lower.

By lowering the first adjustment device, the second adjustment device can be operated without disruptive factors. Additionally, the lowering represents an added value for a shooter that increases the overall comfort of the adjustment tower and therefore of the entire telescopic sight.

Moreover, the adjustments of the second adjustment device can be carried out intuitively, rapidly and nevertheless precisely, without resulting in an unintended adjustment of the first adjustment device. In the adjustment position, the first adjustment device can also be rapidly and precisely controlled. During daylight hours, the first adjustment device can be left in the secured position, and does not represent an obstacle. In contrast, in the dark, the first adjustment device can be moved to the adjustment position or to the secured position as needed.

The present disclosure permits an advantageous structural configuration, which can also be designed as sturdy and having a long service life. The first adjustment device is preferably used for adjusting the illumination of a reticle or a target marker by means of a laser, and the second adjustment device is used for adjusting the optics, particularly parallax or lateral deviation.

The secured position can be designed such that in said position, the lighting mechanism is deactivated. This allows the shooter to determine by touch whether the light is activated or deactivated. However, other assignments of the switch position can also be implemented. A further significant advantage of the present disclosure is that the first control device can be moved from the adjustment position to the secured position at different angles of rotation. With a reverse movement from the secured position to the adjustment position, the angle of rotation also does not change, so that, for example, the correct illumination intensity is quickly present.

As a stored-energy device, a simple compression spring can be provided between base and first adjustment device. The force of the stored-energy device would then be greater in the secured position than in the adjustment position. The force is sufficient for holding the first adjustment device either in the secured position or in the adjustment position. The force in the adjustment position is preferably still great enough that with a normal rotational movement of the first adjustment device, no axial displacement occurs, i.e., the shooter should not obtain the impression that the active force is inadequate. User comfort is thereby increased and an impression of high quality is obtained.

It can be provided according to the present disclosure that, in the secure position, coupling means are engaged and are acted upon by force from the stored-energy device. Such coupling means are suitable for fixing the first adjustment device in the secured position. They can be embodied such that they form a cutout between first adjustment device and base, counter to the force of the stored-energy device. For this purpose, the coupling means need not be disposed directly on the base and the first adjustment device. An indirect flow of force via third parts can also be implemented. The application of force holds the first adjustment device in the secured position. Only by applying an actuating force can the first adjustment device then be moved out of this position.

The present disclosure can further be embodied such that the coupling means are engaged in the adjustment position and are acted upon by force from the stored-energy device. The coupling means are suitable for fixing the first adjustment device in the adjustment position. For this purpose, they can be embodied such that they form a cutout between first adjustment device and base, counter to the force of the stored-energy device. Again, the coupling means need not be disposed directly on the base and the first adjustment device. An indirect flow of force via third parts can also be implemented. The application of force holds the first adjustment device in the adjustment position, and said device can be moved of this position only by applying an actuating force.

One embodiment of the present disclosure provides that the coupling means form a cam mechanism, which is embodied such that when a threshold force on the first adjustment device is overcome counter to the force, followed by a release of force, the stored-energy device moves the cam mechanism to an end position and secures it there.

In this case, the end positions of the cam mechanism can correlate with the adjustment position and the secured position. The cam mechanism remains in each of these end positions until the next actuation by the shooter counter to the force of the stored-energy device. In interaction with the stored-energy device, the cam mechanism therefore secures the adjustment position or the secured position of the first adjustment device.

This provides the advantage that the actuating force can be applied by the shooter for moving the first adjustment device from the secured position to the adjustment position simply by pressing on the first adjustment device against the force of the stored-energy device. The process of actively pulling out the first adjustment device is eliminated. This increases ease of use substantially, and eliminates the need for a projection of the first adjustment device that can be grasped, thereby making the tower particularly compact.

In a further embodiment of the present disclosure, the cam mechanism is such that when an adjustment position is present, and when a threshold force on the first adjustment device is overcome counter to the force, followed by a release of force, the stored-energy device moves the first adjustment device to the secured position and secures it there. It can further be provided that the cam mechanism is embodied such that when a secured position is present and when a threshold force on the first adjustment device is overcome counter to the force, followed by a release of force, the stored-energy device moves the first adjustment device to the adjustment position and secures it there.

The first adjustment device is thereby effectively prevented from being moved from one position to the other without actuation by the shooter. Instead, the first adjustment device remains in the provided secured position, in which a low tower height is present, or in the provided adjustment position, in which it is rotatable.

Particularly advantageous is an embodiment of the present disclosure in which the cam mechanism is disposed on the first adjustment device. In this case, the cam mechanism is coupled to the first adjustment device by the smallest number of parts, and user comfort for the shooter is not impaired by manufacturing tolerances. In addition, the number of components required for the cam mechanism is small, resulting in low cost.

In a version that is easy to produce and cost-effective, the cam mechanism has a groove as the coupling means. Said groove could be produced by milling or using a suitable injection molding form, for example. With a cam mechanism of this type, the secured position and the adjustment position, and particularly also the intermediate movements from the secured position to the adjustment position and vice-versa, can be defined. User comfort is thereby substantially improved.

One embodiment of the present disclosure further provides that the cam mechanism has a transmission guide connected to a ring as the coupling means, wherein the ring is mounted on the first adjustment device such that the transmission guide engages in the groove and connects the ring kinematically to the first adjustment device, so that the ring and the first adjustment device are rotatable relative to one another to a limited extent, and can be displaced axially relative to one another to a limited extent, and wherein the ring is mounted so as to be radially rotatable and axially fixed relative to the base.

In this manner, the first adjustment device and the ring are coupled such that, within the framework of the cam mechanism, they are rotatable radially relative to one another to a limited extent, and are displaceable axially relative to one another to a limited extent. With an axial displacement of the first adjustment device, the ring is then forced via the cam mechanism into defined rotational movements. A ring of this type enables a purely axial displacement of the first adjustment device relative to the base. In addition, the cam mechanism can thereby be used in any angle of rotation of the first adjustment device.

An embodiment of this type could function as follows: When the radially movable and axially fixed transmission guide is coupled with the groove and the cam mechanism is located in the first end position, this could correspond to the adjustment position of the first adjustment device. With an axial movement of the first adjustment device counter to the force of the stored-energy device, the cam mechanism is first moved to an intermediate position. When the shooter then releases the first adjustment device, the force moves the transmission guide such that the cam mechanism moves to the second end position. This correlates with the secured position of the first adjustment device. When the shooter then reactuates the device by moving it counter to the force of the stored-energy device, the cam mechanism is moved to a second intermediate position. When released, the force of the stored-energy device moves the cam mechanism back to the first end position, and the shooter can rotate the first adjustment device.

In one possible technical embodiment, it is provided that the first adjustment device is coupled via a guide element to a guide sleeve, such that the guide sleeve is axially displaceable relative to the first adjustment device, and is not rotatable radially, wherein the guide sleeve is mounted so as to be radially rotatable and axially fixed relative to the base. In particular, the guide element is embodied, for example, as a bolt or pin, which is connected either to the guide sleeve or to the first adjustment device and engages in a guide slot in the other part. If the guide slot is closed on one side, its end forms a limit stop. Relative axial displacement is therefore limited. The structurally simple components that can be implemented with an embodiment of this type contribute to the axial mobility of the first adjustment device. The costs are therefore low.

Because the guide sleeve is mounted so as to be radially rotatable and axially fixed relative to the base, the guide sleeve is able to rotate along with the first adjustment device. A guide sleeve that is rotatable in this manner then enables a defined axial movement of the first adjustment device. Additional components can also be arranged on the guide sleeve, which rotate along with the first adjustment device, but carry out no axial displacement relative to the base. Such components could be a battery or a part of a potentiometer, for example.

Particularly advantageous is an embodiment in which, in the secured position, the first adjustment device is engaged with the base via arresting means.

Rotation of the first adjustment device in the secured position is therefore excluded. This also permits a configuration in which the adjustment device projects slightly outward from the second adjustment device. This is particularly advantageous when the first adjustment device has a cover, which must be unscrewed, for example, in order to replace a battery inside the first adjustment device. The remainder of the first adjustment device is then secured against rotation, and the cover can be screwed on without the rest of the device rotating along with it. Because the battery needs to be replaced only seldom, a narrow collar is sufficient for this purpose, although it would be unacceptable for regular actuations of the first adjustment device.

One embodiment of the present disclosure provides that the arresting means has click-stop stages. This is particularly advantageous because the first adjustment device can thereby be moved to the secured position in multiple angles of rotation and therefore, for example, at different defined light intensities. For example, twelve click-stop stages could be provided, eleven of which form different brightness levels, with the twelfth being a deactivation of the lighting mechanism. Additionally, the secured position can be equipped with a deactivation function for the lighting mechanism. Each of these click-stop stages would offer protection in the secured position against unintended displacement and/or activation of the lighting mechanism.

One structural embodiment could provide that the arresting means is a slot in the first adjustment device, open on at least one side. With this, no additional components are necessary for the arresting means. The slots can also advantageously be produced by machining methods or using an injection molding form. In a particularly advantageous manner, the ends of the slots are equipped with feed slants, to allow the slots to be engaged with an additional arresting means without being tilted.

In one variant, the present disclosure further provides that the additional arresting means is arranged axially fixed and radially fixed on the base. The arresting means could be a bolt or pin inserted into a hole in the base, for example. An embodiment of this type has minimal costs. However, it could also be embodied as integral with the base, for example, as a land/rib. With a possible embodiment in which the arresting means and the first adjustment device are made of metal, a long service life and highly precise click-stop stages are possible.

Special advantages also result when a dwell mechanism is formed indirectly or directly between the base and the first adjustment device. With an indirect embodiment, the flow of force would also pass through third parts.

The dwell mechanism provides a good feeling for the angle of rotation, because the shooter senses the dwell points. Particularly in the dark, the first adjustment device can be moved much more rapidly into the desired position by the shooter counting the dwell points.

One structural embodiment could be such that the dwell mechanism consists of a dwell means and correlating depressions, wherein the dwell means is preferably a spring-mounted ball. The dwell means could also be a raised spot/nose. However, a spring-mounted ball offers significant advantages in terms of user comfort. In particular, with a spring-mounted ball, the adjustment forces do not change significantly over the life of the device, and a long service life is achieved. Ordinarily, a ball of this type rests in a hole on a spring, and projects beyond an edge on one side. On this side, the depressions are arranged in correlation. When the ball is positioned in such a depression, rotation of the first adjustment device is inhibited. In other words, a small amount of force must be overcome in order to rotate said device. Whether the dwell means or the ball is rotated along with the first adjustment device is dependent upon design.

For this purpose, it is provided in one design form that the dwell means is arranged between the base and the rotatable but axially fixed guide sleeve. In this case, the dwell means does not need to compensate for any axial displacement and can be small. In particular, the spring-mounted ball can be arranged axially movable and rotationally fixed relative to the base, and the depressions can be provided on the guide sleeve. If the depressions are embodied as integral with the guide sleeve, the cost of the dwell mechanism can be very low.

It is extremely advantageous for the arresting means and the dwell means to correlate with respect to the angle of rotation. The first adjustment device can thus be moved into the secured position in the dwell positions by an axial movement, without being hooked or tilted. A high level of user comfort is thereby achieved without increasing production costs.

It is further advantageous for the diameter of the first adjustment device to be smaller than the diameter of the second adjustment device. Thereby, even in the dark, the two adjustment devices are clearly offset and can be grasped.

All mechanical movements in the adjustment tower are preferably cushioned. For this purpose, a suitable lubrication can be used, or additional cushioning elements are built in. This increases the sensation of quality, and reduces noises that could scare off wildlife, for example.

BRIEF DESCRIPTION OF THE DRAWINGS

Additional features, details and advantages of the invention are specified by the wording of the claims and by the following description of embodiment examples, in reference to the set of drawings. The drawings show:

DETAILED DESCRIPTION OF THE DRAWINGS

Figure 1:
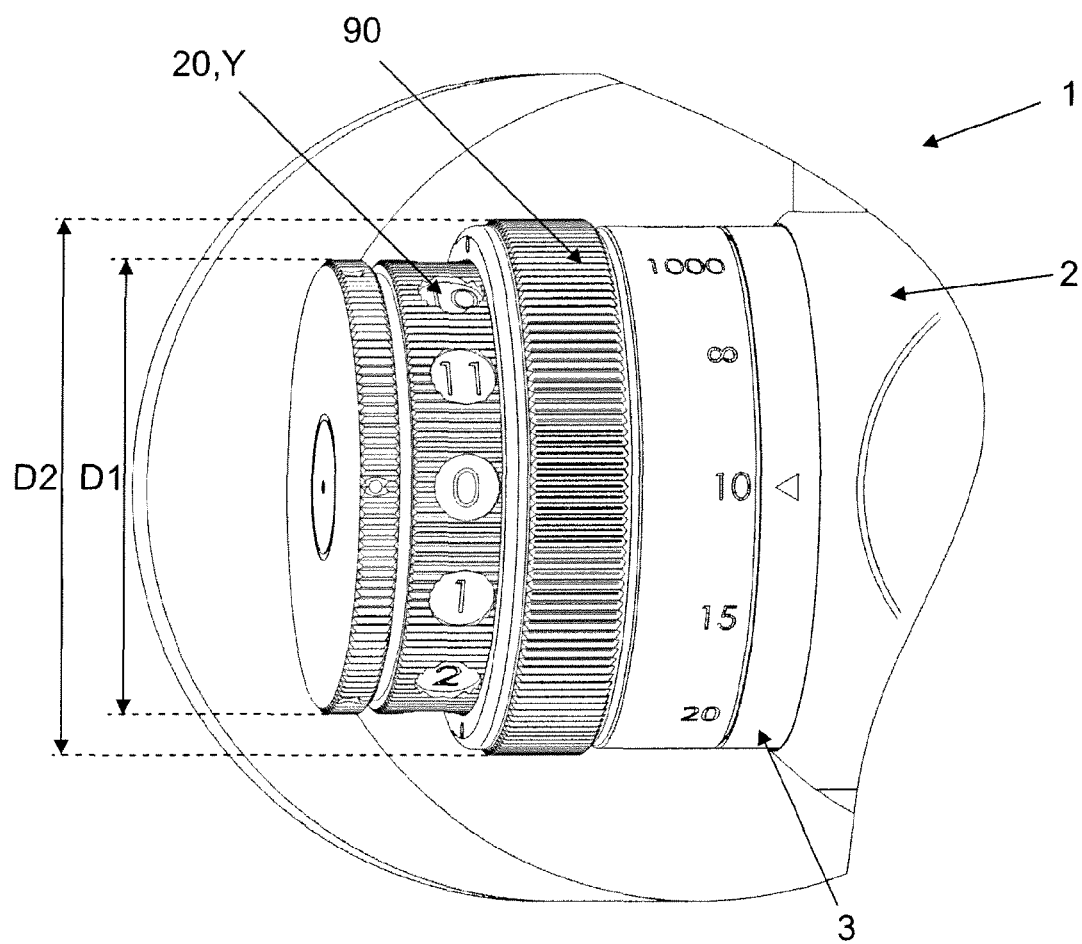
FIG. 1 an adjustment tower according to the present disclosure having a first adjustment device in the adjustment position.

FIG. 1 shows a view of an adjustment tower 1 according to the present disclosure, arranged on a telescopic sight 2. Said tower consists of a first adjustment device 20 and a second adjustment device 90, which can be rotated independently of one another relative to a base 3 that is connected to the telescopic sight 2. The diameter D1 of the first adjustment device 20 is smaller than the diameter D2 of the second adjustment device 90. The first adjustment device is disposed in an adjustment position Y.

Figure 2:
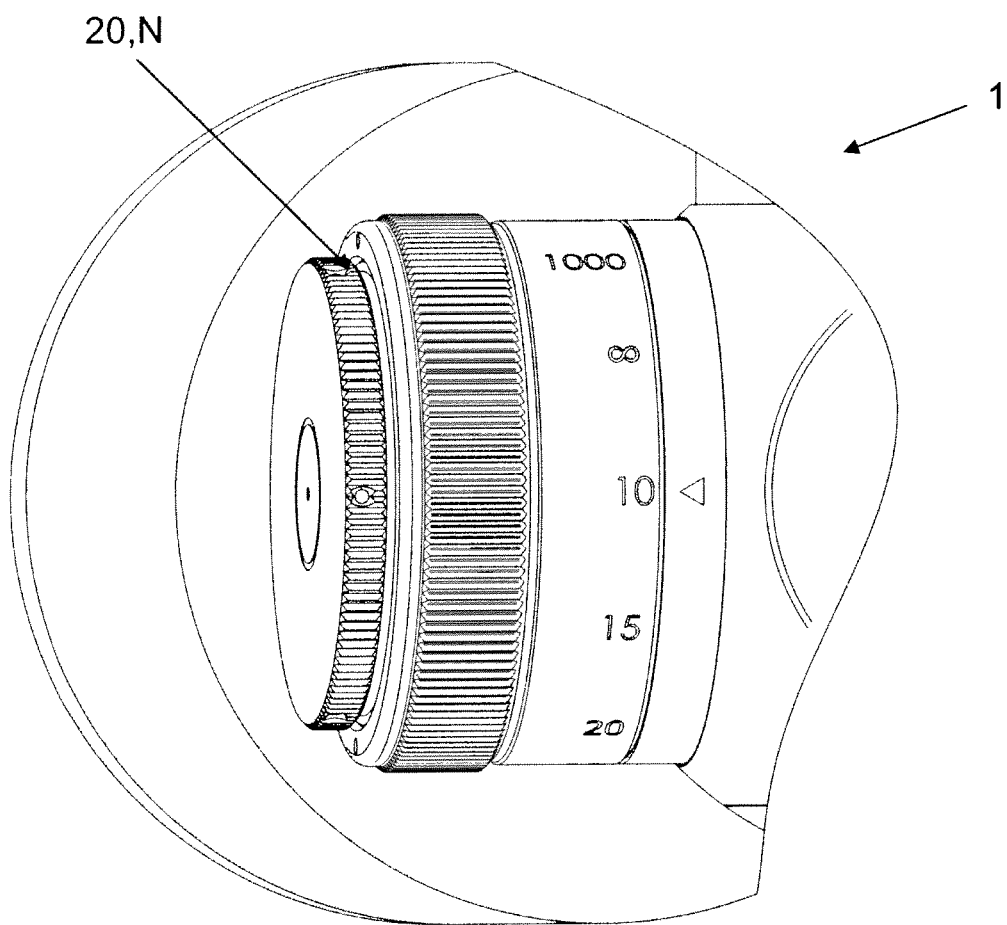
FIG. 2 an adjustment tower according to the present disclosure having a first adjustment device in the secured position.

FIG. 2 shows an adjustment tower 1 according to the invention comprising a first adjustment device 20 disposed in the secured position N.

Figure 3:
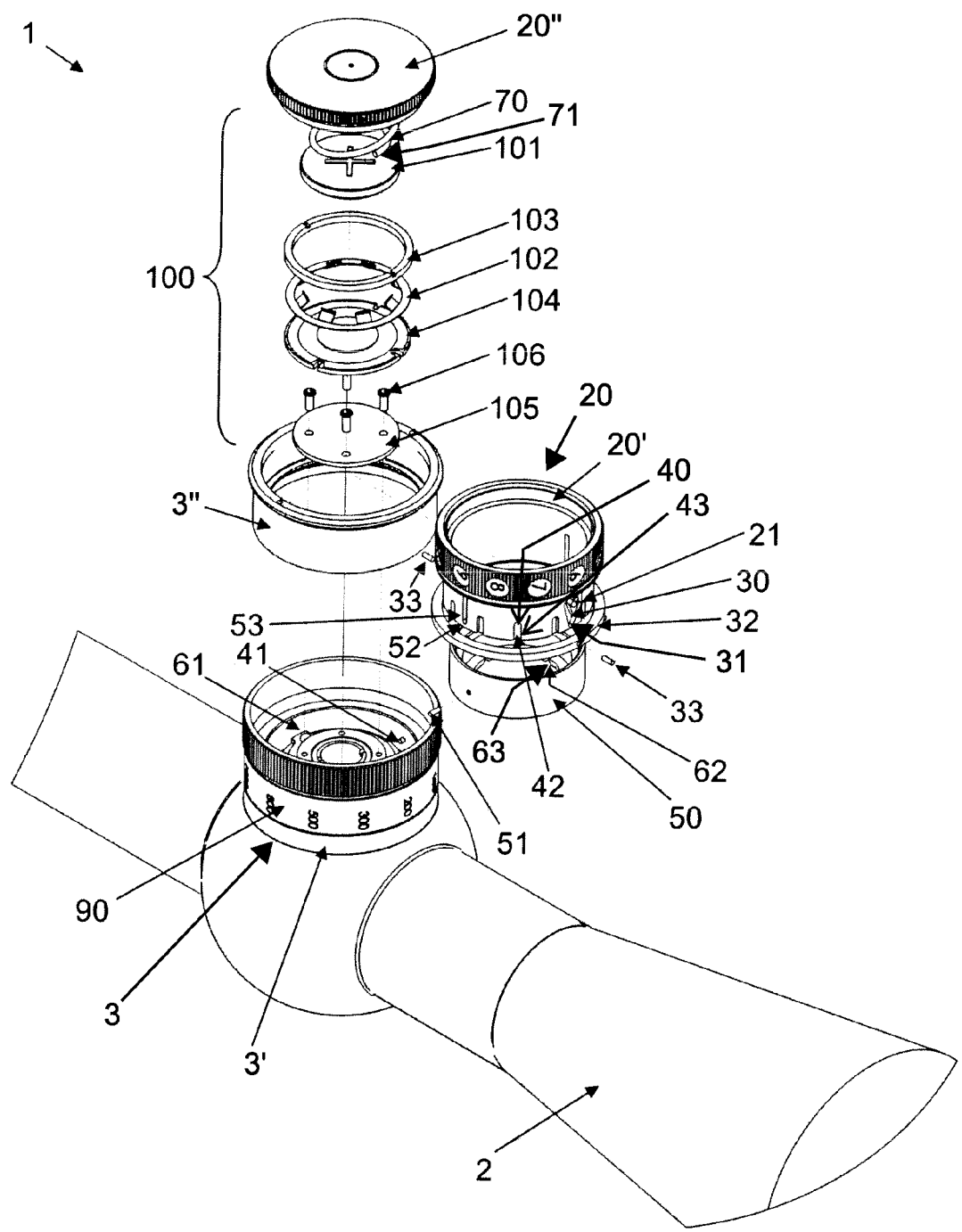
FIG. 3 an exploded diagram of the essential components of an adjustment tower according to the present disclosure.

FIG. 3 shows an exploded diagram of the essential components of an adjustment tower 1 according to the present disclosure. A telescopic sight 2 is first connected to a base 3 for a first adjustment device 20 and a second adjustment device 90, which has a hollow core. The two devices are rotatable, independently of one another, relative to the base 3. In this case, the first adjustment device 20 is used for adjusting light intensity and the second adjustment device 90 is used for adjusting optics in the telescopic sight 2. For assembly and production purposes, the base 3 is embodied as comprising multiple parts 3', 3".

The first adjustment device 20 is comprised of two parts 20', 20", and particularly has a separate cover 20' that can be unscrewed.

A spring 71 is arranged between the cover and the base 3 as a stored-energy device 70. The spring 71 serves primarily to exert an axial force on the first adjustment device from a secured position in the direction of an adjustment position. Additionally, it fixes a battery 101 in place. The battery is further connected to the guide sleeve 50, axially fixed and rotationally fixed, by means of a clamping ring 102 and a fastening ring 103, together with a potentiometer upper part 104. By unscrewing the cover, the battery 102 can be removed from the adjustment tower 1. In the secured position, the cover preferably still projects far enough out of the second adjustment device 90 that the cover can be unscrewed by hand. In this position, the remainder of the first adjustment device 20 is fixed in place and does not rotate as the cover screw connection is being loosened.

The first adjustment device 20 also has a jacket 21, in which a plurality of functional elements is integrated. These include, for example, a coupling means embodied as a groove 31, and a guide slot 53, extending in an axial direction, with ends that are closed toward the top and the bottom, which serve as limit 52 stops.

In the assembled state, a guide sleeve 50 is disposed inside the jacket 21 and has a guide element 51 in the form of a pin or bolt, which can be placed in engagement with the guide slot 53. The guide element 51 and the first adjustment device 20 are thereby coupled to one another such that the guide sleeve 50 can be displaced axially relative to the first adjustment device 20 up to the end of the limit stop 52, and cannot be radially rotated. In this case, a plurality of couplings of this type could also be disposed around the circumference of the jacket 21.

The guide sleeve 50 is also mounted so as to be radially rotatable and axially fixed relative to the base 3. Therefore, the first adjustment device 20 is also rotatable relative to the base 3, and can be moved against the force of the spring 71 from a position in which it projects further out of the second adjustment device 90 into a position in which it projects less from said device. The latter position could also be a complete recession into the second adjustment device 90.

In order for the rotation of the first adjustment device 20 to be carried out sensitively and selectively, a dwell mechanism 62 is arranged on the guide sleeve 50. Said mechanism is embodied such that in the guide sleeve 50, depressions 63 are provided, in which a ball 61 that is spring-mounted on the base 3 can engage. When the ball 61 is positioned in the depression 63, rotation of the first adjustment device 20 is inhibited. Preferably, when the ball 61 is positioned between the depressions 63, the dwell mechanism 62 is not self-locking, so that the first adjustment device 20 will not become stuck in an intermediate position, and will instead move to one of the provided dwell positions.

As a further essential component, a ring 32 is arranged around the jacket 21. A coupling means arranged on the ring 32 is a transmission guide 33. Said guide is embodied in the form of a pin or bolt and engages in the groove 31, whereby a cam mechanism 30 is formed. In this manner, the first adjustment device 20 and the ring 32 are coupled such that within the framework of the cam mechanism 30, they are capable of rotating radially relative to one another to a limited extent and are axially displaceable relative to one another to a limited extent. The ring 32 is further mounted so as to be axially fixed and rotatable relative to the base 3.

During an axial displacement of the first adjustment device 20, said device is prevented from rotating by means of the dwell mechanism 62. In contrast, the ring 32 is thereby forced into defined rotational movements by way of the cam mechanism 30.

Also provided on the jacket 21 is an arresting means 40. Said means consists of slots 43, which form different click-stop stages 42. In a secured position, this arresting means 40 is engaged with an arresting means 41 mounted on the base in such a way that a rotation of the first adjustment device 20 relative to the base 3 is not possible.

In this case, the cam mechanism 30 is embodied such that the first adjustment device 20 can be moved from an adjustment position, in which said device clearly projects out of the second adjustment device 90, into the secured position by applying axial force against the force of the spring 71. In this, both the adjustment position and the secured position are self-locking due to the geometry of the groove 31. With a renewed application of axial force against the force of the spring 71 and a subsequent release, the first adjustment device 20 is moved back to the adjustment position.

In addition to the battery 101, the clamping ring 102, the fastening ring 103 and the potentiometer upper part 104, which rotate along with the first adjustment device 20, an electronic unit 100 is completed by a potentiometer lower part 105 that is connected non-rotatably and axially fixed to the base 3 by means of screws 106. Rotating the potentiometer upper part 104 relative to the potentiometer lower part 105 changes the electric resistance of the potentiometer. A light intensity of a lighting unit that is electrically connected to the adjustment tower 1 results on the basis of this resistance. To be able to adjust suitable light intensities, therefore, the resistance correlates with the arresting means (40, 41) or the click-stop stages 42.

It can further be provided that the flow of current between two click-stop stages is interrupted completely by placing a dwell point having infinite resistance between two dwell points of the dwell mechanism 62 in which current flows. This enables a very rapid activation and deactivation, since the angle of rotation between activation and deactivation is very small.

Figure 4:
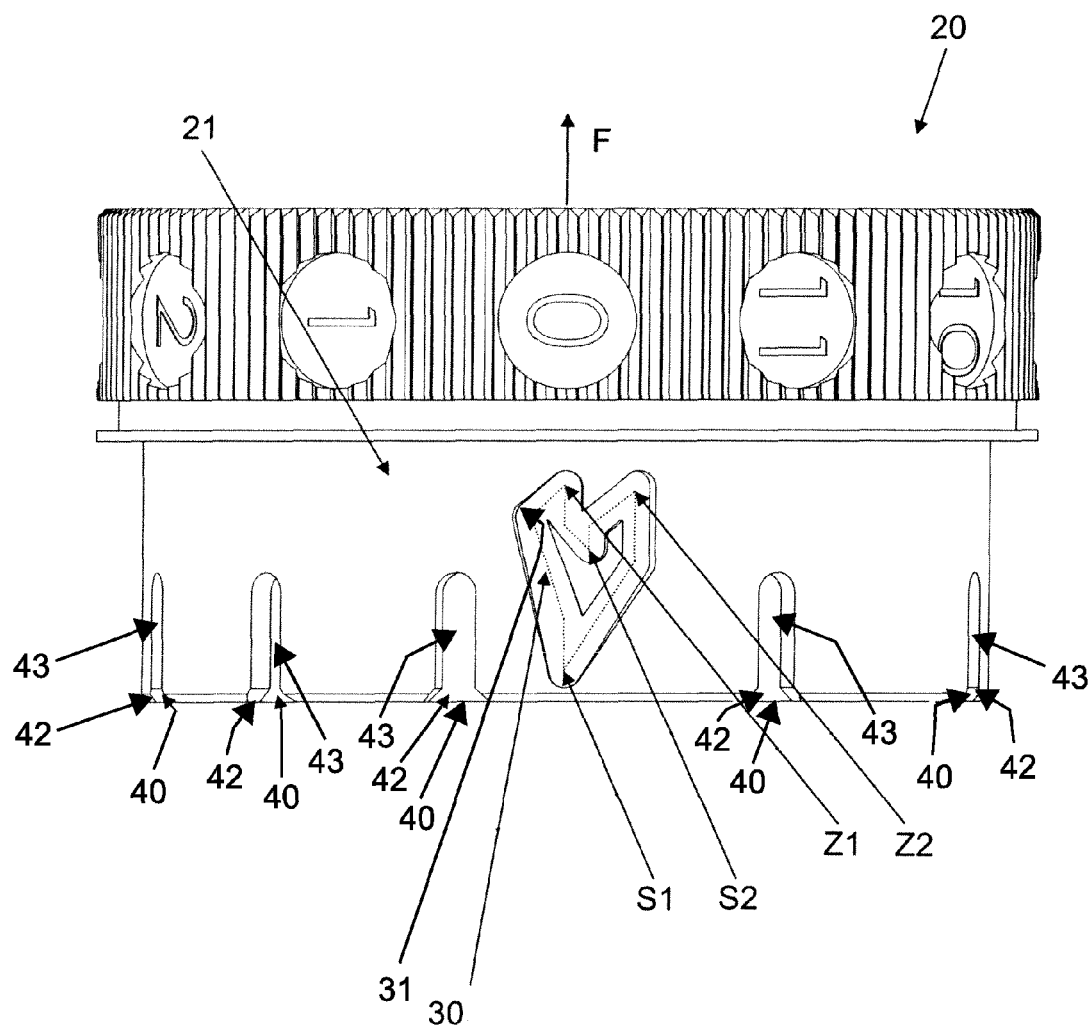
FIG. 4 a detailed view of the first adjustment device according to the present disclosure.

FIG. 4 shows a detailed view of an adjustment device 20 according to the present disclosure, without a cover. In a jacket 21 of the first adjustment device 20, an arresting means 40 is located, which is formed by slots 43 which are open downward, with feed slants. The feed slants equalize imprecisions in tolerance and enable a harmonic, non-catching actuation of the first adjustment device 20 in moving from an adjustment position to a secured position. Each of the slots 43 can be brought into engagement with an additional arresting means, and thereby defines a click-stop stage 42, for example, for light intensity.

In addition, a groove 31 is integrated into the jacket 21. Said groove does not extend through the jacket 21, because a core is necessary at the center of the groove 31. The groove 31 describes a closed path and defines a first end position S1 and a second end position S2. Between these end positions S1, S2, a first intermediate position Z1 lies on a first connection path and a second intermediate position Z2 lies on a second connection path.

When a radially movable and axially fixed transmission guide 33 is coupled with the groove 31, a cam mechanism 30 is formed. A first end position S1 corresponds to an adjustment position of the first adjustment device 20. With an axial movement of the first adjustment device 20 downward against a force F, the transmission guide 33 is first moved into the intermediate position Z1. When the shooter then releases the first adjustment device 20, the force F moves the transmission guide 33 to the second end position S2. This position correlates with a secured position of the first adjustment device 20, in which the arresting means 40 are in engagement with an additional arresting means. When the mechanism is re-actuated by a movement counter to the force F, the transmission guide 33 is moved to the second intermediate position Z2. After release, the force F moves the transmission guide 33 back to the first end position S1 and the shooter can adjust the light intensity, for example, by rotating the first adjustment device 20.

Figure 5:
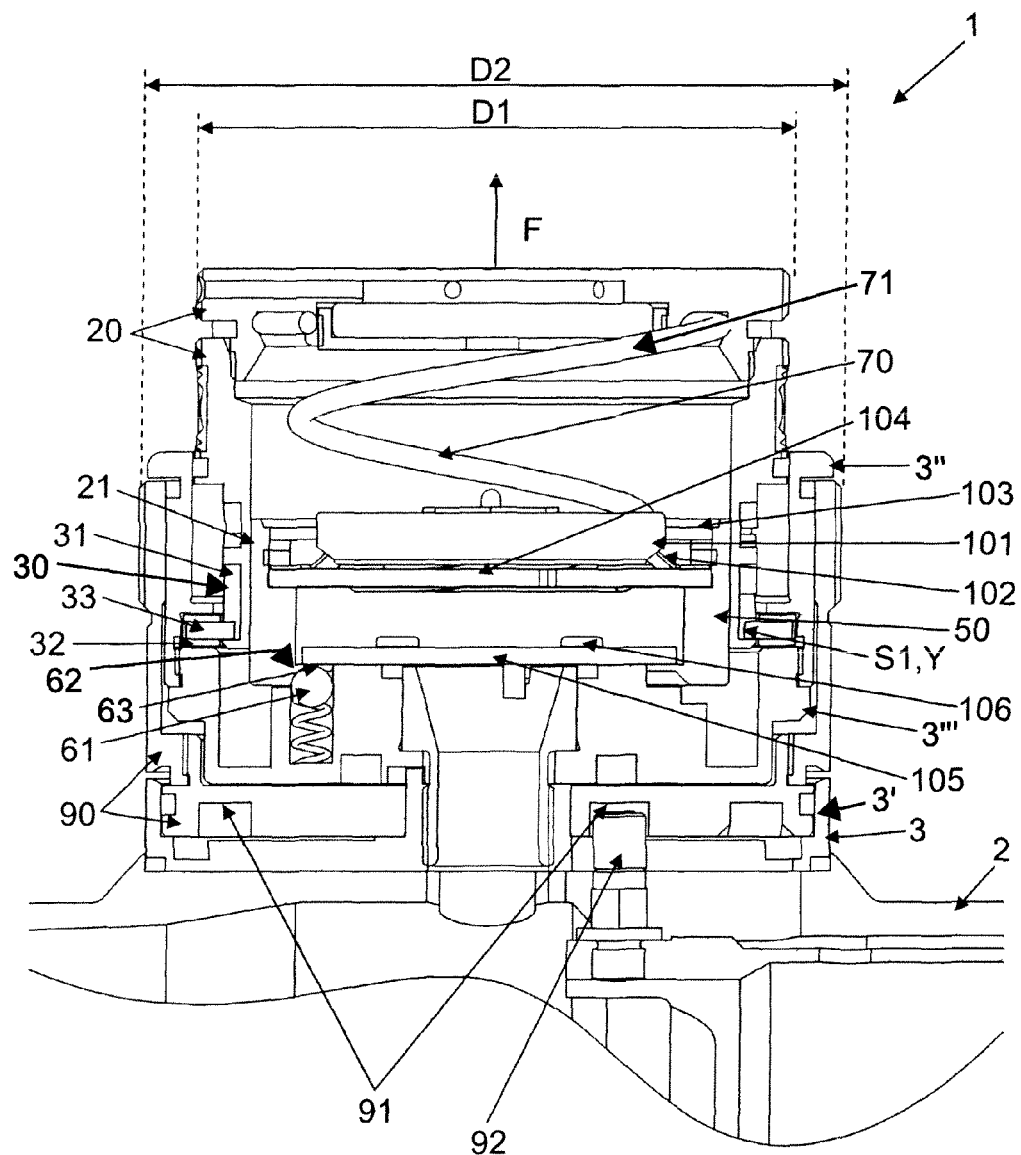
FIG. 5 a cross-section of an adjustment tower according to the present disclosure.

FIG. 5 is a cross-section of an adjustment tower 1 according to the present disclosure, comprising a first adjustment device 20 and a second adjustment device 90.

A telescopic sight 2 is first connected to a base 3 for the first adjustment device 20 and the second adjustment device 90. The second adjustment device 90, which has a hollow core, is rotatably mounted on this base 3. By rotating the second adjustment device 90 via a provided spiral groove 91, said device can displace an adjustment pin 92 that is coupled thereto. This results in a mechanical adjustment of the optics of the telescopic sight 2. This could correspond to parallax or lateral adjustment.

Above and in the core of the second adjustment device 90, the first adjustment device 20 is shown, which is used to adjust light intensity. A ring 32 and a guide sleeve 50, for example, are arranged on said device. The first adjustment device 20 has a diameter D1 that is smaller than the diameter D2 of the second adjustment device 90.

The first adjustment device 20 is embodied as comprising two parts, more particularly, it has a separate cover that can be unscrewed. Between this cover and the base 3, a spring 71 is arranged as a stored-energy device 70. Said device exerts a force F on the first adjustment device 20 and further serves to fix a battery 101 in place. The battery is also connected by means of a clamping ring 102 and a fastening ring 103, together with a potentiometer upper part 104, to the guide sleeve 50 so as to be axially fixed and rotationally fixed. By unscrewing and removing the cover along with the spring 71, the battery 102 can be removed from the adjustment tower 1.

The first adjustment device 20 further has a jacket 21, in which a plurality of functional elements is integrated. Illustrated are, for example, two coupling means embodied as grooves 31, arranged on opposite sides. Inside this jacket 21, the guide sleeve 50 is arranged and is coupled with the first adjustment device 20 such that the guide sleeve 50 is axially displaceable relative to the first adjustment device 20 to a limited extent, and is not rotatable radially. This also causes the spring 71 to always rotate with the guide sleeve 50 and the first adjustment device 20.

The guide sleeve 50 is further mounted so as to be radially rotatable and axially fixed relative to the base 3. Therefore, the first adjustment device 20 is also rotatable relative to the base 3 and can be moved against the force F of the spring 71 from a position in which it projects further out of the second adjustment device 90 into a position in which is projects less out of said device. The latter position could also be a complete recession into the second adjustment device 90.

In order to carry out a sensitive and selective rotation of the first adjustment device 20, a dwell mechanism 62 is provided between the base 3 and the guide sleeve 50. Said mechanism consists of a dwell means and depressions 63 on the guide sleeve 50. The dwell means, which is embodied as a ball 61 that is spring-mounted on the base 3, engages in these depressions 63. When the ball 61 is positioned in one of the depressions 63, the rotation of the first adjustment device 20 is inhibited. The dwell mechanism 62 preferably is not self-locking when the ball 61 is positioned between two depressions 63, so that the first adjustment device 20 does not become stuck in an intermediate position. Instead, rotating the first adjustment device 20 will cause the means to move into one of the provided dwell positions—in particular, the ball 61 into one of the depressions 63.

If a dwell mechanism will also be provided for the second adjustment device 90, the hole in which the spring 71 rests can be configured as continuous. A ball 61 must then be arranged on both sides of the spring 71. In addition, depressions that correspond with the second balls would have to be provided in the second adjustment device 90.

The ring 32, in turn, is disposed around the jacket 21. A transmission guide 33 in the form of a pin or bolt, connected to the ring 32 and embodied as a coupling means, engages in the groove 31 and thereby forms a cam mechanism 30. In this manner, first adjustment device 20 and ring 32 are coupled in such a way that, in the framework of the cam mechanism 30, they are radially rotatable relative to one another to a limited extent and are axially displaceable relative to one another to a limited extent. The ring 32 is further mounted relative to the base 3 such that it is axially fixed and rotatable relative thereto.

With an axial displacement of the first adjustment device 20, said device is inhibited from rotating by the dwell mechanism 62. In contrast, the ring 32 is thereby forced by way of the cam mechanism 30 into defined rotational movements.

In the view that is illustrated here, the cam mechanism 30 is located in a first end position S1, which correlates with an adjustment position Y of the first adjustment device 20. Therefore, the latter is rotatable in the view that is shown.

To adjust the light intensity, in addition to the battery 101, the clamping ring 102, the fastening ring 103 and the potentiometer upper part 104, all of which rotate along with the adjustment device 20, a potentiometer lower part 105 is provided, which is connected non-rotatably and axially fixed to the base 3 by means of screws 106. A relative rotation of potentiometer upper part 104 and potentiometer lower part 105 changes the electric resistance of the potentiometer. A light intensity of a light unit that is electrically connected to the adjustment tower 1 results on the basis of this resistance.

The present disclosure is not limited to any one of the above-described embodiments, and can instead be modified in a multitude of ways.

All features and advantages proceeding from the claims, the description and the set of drawings, including structural details, spatial configurations and process steps, can be considered essential to the invention both alone and in the widest range of combinations.

The invention claimed is:

1. An adjustment tower for telescopic sights comprising a first adjustment wheel and a second adjustment wheel, which are mounted to a common base and are capable of rotating independently of one another relative to the common base and about a common rotational axis, wherein the first adjustment wheel can be rotated in an adjustment position and has a secured position in which the first adjustment wheel is secured against rotation, and wherein the first adjustment wheel is capable of moving axially relative to the common base and the second adjustment wheel to a limited extent, such that said first adjustment wheel projects farther out of the second adjustment wheel in the adjustment position than in the secured position, and further comprising a stored-energy device that exerts an axial force on the first adjustment wheel from the secured position in the direction of the adjustment position.

2. The adjustment tower according to claim 1, further comprising coupling means that is engaged and acted upon by the axial force from the stored-energy device when the first adjustment wheel is in the secured position.

3. The adjustment tower according to claim 2, wherein the coupling means is engaged and acted upon by the axial force from the stored-energy device when the first adjustment wheel is in the adjustment position.

4. The adjustment tower according to claim 2, wherein the coupling means comprises a cam mechanism such that, when a threshold force on the first adjustment wheel is overcome counter to the axial force, followed by a release of force, the stored-energy device moves the cam mechanism to an end position, the cam mechanism being secured in the end position by the stored-energy device.

5. The adjustment tower according to claim 4, wherein the cam mechanism is configured such that when the first adjustment wheel is in the adjustment position, and when the threshold force on the first adjustment wheel is overcome counter to the axial force, followed by the release of force, the stored-energy device moves the first adjustment wheel to the secured position, the first adjustment wheel being secured in the secured position by the stored-energy device.

6. The adjustment tower according to claim 4, wherein the cam mechanism is disposed on the first adjustment wheel.

7. The adjustment tower according to claim 4, wherein the cam mechanism has a groove as the coupling means.

8. The adjustment tower according to claim 7, wherein the cam mechanism further has a transmission guide connected to a ring as the coupling means, wherein the ring is mounted on the first adjustment wheel such that the transmission guide engages in the groove and kinematically connects the ring to the first adjustment wheel, so that the ring and the first adjustment wheel are rotatable relative to one another to a limited extent and are axially displaceable relative to one another to a limited extent, and wherein the ring is mounted so as to be radially rotatable and axially fixed relative to the base.

9. The adjustment tower according to claim 1, wherein the first adjustment wheel is coupled via a guide element to a guide sleeve such that the guide sleeve is axially displaceable relative to the first adjustment wheel and is not radially rotatable, wherein the guide sleeve is mounted so as to be radially rotatable and axially fixed relative to the base.

10. The adjustment tower according to claim 1, wherein when the first adjustment wheel is in the secured position, the first adjustment wheel is engaged via arresting means with the base.

11. The adjustment tower according to claim 10, wherein the arresting means has click-stop stages.

12. The adjustment tower according to claim 10, wherein the arresting means comprises at least one slot that is open on one side in the first adjustment wheel.

13. The adjustment tower according to claim 10, wherein the arresting means is axially fixed and radially fixed on the base.

14. The adjustment tower according to claim 1, further comprising a dwell mechanism that is formed indirectly or directly between the base and the first adjustment wheel.

15. The adjustment tower according to claim 14, wherein the dwell mechanism comprises a dwell means and correlating depressions.

16. The adjustment tower of claim 15, wherein the dwell means comprises a spring-mounted ball.

17. An adjustment tower comprising a base, said base being arranged on a tubular center region of a telescopic sight, the adjustment tower projecting axially outward from the tubular center region in the direction of a rotational axis, said adjustment tower comprising a first adjustment wheel and a second adjustment wheel, which are mounted to the base and are capable of rotating independently of one another relative to the base and about the rotational axis, wherein the first adjustment wheel can be rotated in an adjustment position and has a secured position in which the first adjustment wheel is secured against rotation, and wherein the first adjustment wheel is capable of moving axially relative to the base and to the second adjustment wheel to a limited extent, such that said first adjustment wheel projects farther out of the second adjustment wheel in the adjustment position than in the secured position, and further comprising a stored-energy device that exerts an axial force on the first adjustment wheel from the secured position in the direction of the adjustment position.

* * * * *